United States Patent [19]

Tsutsui et al.

[11] 4,287,036
[45] Sep. 1, 1981

[54] METHOD FOR PRODUCING A REDUCTION PRODUCT USING A PHOTO-REGENERATED TRANSITION METAL CATALYST

[75] Inventors: Minoru Tsutsui, Bryan, Tex.; Yoshiharu Doi, Tokyo, Japan

[73] Assignee: Texas A & M University, College Station, Tex.

[21] Appl. No.: 148,015

[22] Filed: May 8, 1980

[51] Int. Cl.$^3$ .............................................. B01J 19/12
[52] U.S. Cl. ........................ 204/157.1 R; 204/158 R; 204/162 R
[58] Field of Search ......... 204/158 N, 162 R, 157.1 R

[56] References Cited

U.S. PATENT DOCUMENTS 4,173,521  11/1979  Wade ........................... 204/157.1 R

OTHER PUBLICATIONS

Shilov et al., *Nature*, 231 (Jun. 18, 1971), pp. 460, 461.
Zones et al., J.A.C.S., vol. 98 (1976), pp. 7289–7295.
Nikonova et al., J. Mol. Catalysis, vol. 1 (1975/76), pp. 367–374.
Koryakin et al., Doklady Akademii Nauk SSSR, vol. 229, No. 1 (Jul. 1976), pp. 614–616.
Doi et al., J.A.C.S., vol. 100 (1978), pp. 3243–3244.

*Primary Examiner*—Howard S. Williams
*Attorney, Agent, or Firm*—Arnold, White & Durkee

[57] ABSTRACT

A catalytic method of reducing chemical compounds in solution utilizing a transition metal alcoholate complex as the reducing agent is disclosed. More particularly, this active reducing complex is produced and regenerated from its oxidized inactive state simultaneously with its conversion to such inactive state during the reduction process by exposure to radiation of an appropriate wavelength and intensity. The catalytic method is particularly useful in the reduction of molecular nitrogen to hydrazine and ammonia. Other useful applications involve the reduction of hydrazine to ammonia, of aliphatic substituted hydrazine to aliphatic amines, of alkynes to alkenes and alkanes, of alkenes to alkanes, and of oxides of nitrogen and carbon.

16 Claims, No Drawings

METHOD FOR PRODUCING A REDUCTION PRODUCT USING A PHOTO-REGENERATED TRANSITION METAL CATALYST

BACKGROUND OF THE INVENTION

The invention relates to a catalytic method of reducing chemical compounds in solution. The catalyst is a transition metal alcoholate complex. This catalytic complex may be produced and is regenerated by exposure to radiation of the appropriate wavelength.

It is well known that vanadium (II) is a strong reducing agent. However, the divalent ion is also the least stable and consequently the least important of the oxidation states of vanadium.

Transition metal ions, the best being the highly reactive vanadium (II), have been shown to reduce molecular nitrogen, acetylene, ethylene and carbon monoxide under certain conditions. The transition metal ions, being oxidized and consumed in the course of these reactions, are reducing agents and not true catalysts.

A research group heated by Schrauzer investigated reductions by vanadium (II). Zones, et al., "The Reduction of Molecular Nitrogen, Organic Substrates, and Protons by Vanadium (II)," *J. Am. Chem. Soc.* 98, 7289 (1976). In this article, the authors set forth the reduction of acetylene to ethylene and the reduction of ethylene to ethane by vanadium (II) hydroxide. They also indicate that hydrazine may be produced by the reaction of molecular nitrogen with alkaline suspensions of vanadium (II) hydroxide in magnesium hydroxide. In the absence of the magnesium hydroxide host lattice, only traces of hydrazine were formed by the reaction of nitrogen with vanadium (II) hydroxide. The addition of vanadium (III) to vanadium (II)/magnesium hydroxide systems prevented hydrazine formation and increased the evolution of hydrogen.

The group under the direction of Schrauzer also reduced acetylene, ethylene and 2-butyne respectively to ethylene or ethane, ethane and cis-2-butene using mixed hydroxide gels of vanadium (II)/magnesium hydroxide. Vanadium (II) was oxidized to vanadium (IV) during this reduction. Whereas vanadium (II) hydroxide had reduced nitrogen only in strongly alkaline media and in the presence of magnesium hydroxide to produce only traces of hydrazine and ammonia, in the form of a mixed hydroxide gel, at 0°–25° C., nitrogen was reduced virtually exclusively to hydrazine. At temperatures between 70° and 90° C., a secondary reduction of hydrazine to ammonia occured. Production of hydrazine was increased at elevated nitrogen pressures.

Schrauzer's group also reported on the effect of ultraviolet light in some of these reductions. They mention that the evolution of hydrogen, as well as the reduction of certain substrates by vanadium (II) in homogeneous acidic solutions, was stimulated by ultraviolet light. Irradiation of acidic solutions of vanadium (II) with ultraviolet light reduced acetylene, ethylene and, to a certain extent, nitrogen. The reactions of vanadium (II) hydroxide and of vanadium (II)/magnesium hydroxide with substrates were not markedly influenced by irradiation of the gels with ultraviolet light. Hydrogen evolution and reduction of acetylene, as well as ethylene in acidic solutions of vanadium (II) were stimulated by ultraviolet light. Traces of nitrogen were reduced to ammonia under similar conditions. Corresponding reactions occurred only very slowly, or not at all, in the dark or on irradiation with visible light. Whereas hydrogen evolution and ethylene and acetylene reduction were efficiently stimulated by ultraviolet light, the light-induced reduction of nitrogen produced only traces of ammonia under the same conditions.

The research by Schrauzer's group discussed above was directed to studies of the reducing properties of vanadium (II). Reactions of vanadium (II) as a reducing agent were studied. No attempt was reported to produce a catalytic reaction using divalent or trivalent vanadium as a catalyst, and not simply as a reducing agent.

A research group under the direction of Shilov studied the reduction of nitrogen by a vanadium (II)-catechol system. Nikonova, et al., "A Comparison of the Reduction of Dinitrogen by a Vanadium (II)-Catechol System with That by the Active Centre of Nitrogenase," *J. Mol. Catal.* 1, 367 (1976). Several molybdenum or vanadium containing compounds reduced molecular nitrogen to hydrazine and ammonia with the participation of solvent protons. A vanadium (II)-catechol complex reduced molecular nitrogen to ammonia in homogeneous aqueous and alcoholic media under mild conditions. The vanadium (II)-catechol complex is a strong reducing agent and reacted with the protons in the water molecules to form vanadium (III) and hydrogen. In the presence of nitrogen at a pH of 8.5–14, both in aqueous and alcohol solutions, a competitive reduction of molecular nitrogen to ammonia occurred. This reduction of nitrogen was inhibited by carbon monoxide and acetylene. Hydrazine was readily reduced to ammonia by vanadium (II)-catechol complexes.

The research by this group under the direction of Shilov was also directed to the study of vanadium (II) as a reducing agent. In this research, as in that of Schrauzer's group, the well-established reducing properties of divalent vanadium were further investigated.

A number of prior workers have attempted to reproduce the process of nitrogen "fixation," the naturally-occurring reduction of molecular nitrogen to ammonia by certain types of plants through a process which is believed to be enzymatic. For example, another group under the direction of Shilov investigated the reduction of nitrogen in protonic media in the presence of several metal compounds. Shilov, et al., "New Nitrogenase Model for Reduction of Molecular Nitrogen in Protonic Media," *Nature* 231, 460 (June 18, 1971). In the laboratory, titanium (III), chromium (II) and vanadium (II) were shown to reduce molecular nitrogen to both hydrazine and ammonia in aqueous and alcohol solutions. The reduction by titanium (III) and chromium (II) proceeded only in the presence of molybdenum compounds. The publication states, on the other hand, that vanadium (II) reduced nitrogen in the absence of molybdenum compounds, and formed the most active systems for reducing molecular nitrogen. The reduction of nitrogen proceeded only at a pH greater than 7. Alkaline solutions containing titanium (III), chromium (II) and vanadium (II) in the absence of molybdenum compounds also reduced acetylene to ethylene.

Although Shilov demonstrated that several metals, including vanadium (II), were capable of reducing molecular nitrogen, acetylene or ethylene, no true catalytic acticity was established. Again in these studies the well-known properties of divalent vanadium as a reducing agent were investigated.

Koryakin, et al. studied the photo-reduction of vanadium (III) to the divalent state in water-alcohol solutions. "Photocatalytic Liberation of Hydrogen from Water-Alcohol Solutions of Vanadium Trichloride," *Dokl. Akad. Nauk SSSR* 229, 128 (1976). This process was further investigated by Applicants. Doi, Y and M. Tsutsui, "Fluorescence and Photochemistry of the Charge-Transfer Band in Alcoholic Vanadium Trichloride Solution," *J. Amer. Chem. Soc.* 100, 3243 (1978). Photo-reduction was observed to be accompanied by the simultaneous catalytic formation of hydrogen and the oxidition of the alcohol to an aldehyde. Vanadium (III) alcoholate complexes in the parent alcohol solution exhibited luminescence of relatively high quantum yield upon excitation at the charge-transfer band with a competitive photo-reduction of vanadium to the divalent state.

Methods of catalytically reducing molecular nitrogen to ammonia have long been sought. Although the strong reducing activity of divalent vanadium has long been known, and studies indicated its capability to reduce molecular nitrogen, the divalent vanadium was stoichiometrically consumed in the reduction. Thus, any reduction employing divalent vanadium as the reducing agent required the continual replenishment of the consumed reactant, vanadium (II).

SUMMARY OF THE INVENTION

The subject invention overcomes the disadvantages of the above-discussed reductions by providing a reaction environment in which the active reducing agent may be continuously regenerated from its inactive oxidized state. A catalytic reduction is accomplished by thus eliminating the overall consumption of the reducing agent.

The subject invention combines a photo-reduction of an inactive transition metal ion to an active state which is quicklly oxidized during the reduction desired. The invention relates to a catalytic method of reducing chemical compounds in solution. The catalyst is a transition metal alcoholate complex. This catalytic complex may be produced and is regenerated by exposure to radiation of the appropriate wavelength.

The present invention provides a method for creating a chemically active reducing environment in solution in which the reducing agent is capable of being continuously regenerated to its chemically active reducing state. The reducing activity of the solution environments created according to the present invention are such that molecular nitrogen may be reduced to ammonia at ambient temperatures and pressures. Substituted hydrazines, acetylene, ethylene, and carbon and nitrogen oxides may also be reduced by the present invention.

According to the method of the invention, a solution is first formed comprising a soluble salt of a transition metal dissolved in a monoprotic alcohol compatible with the transition metal salt. The pH of the solution is maintained at a value above about 8.5 through the addition to the solution of a suitable alkaline material such as sodium hydroxide. This solution may further comprise a multidentate bridging compound, such as catechol.

In solution, the transition metal combines with the alcohol to form a soluble metal alcoholate complex wherein the transition metal atom is at a first electron state. This electron state is raised to a more active, reducing state through a photo-reduction process. The solution containing the metal alcoholic complex is subjected to irradiation of an intensity and duration suitable to cause the inactive transition metal to be reduced to the active state. In this active state, the transition metal is a strong reducing agent.

The transition metal alcoholate complex solution, maintained at an alkaline level about above pH 8.5 comprises the chemically active reducing environment. This environment appears to be made more efficient by the addition to the solution of a multidentate bridging compound, such as catechol.

The chemical containing the bond to be reduced is brought into contact with the catalyst containing solution. Means of obtaining this contact include directly introducing the chemical into the solution, or maintaining the solution under an atmosphere comprising the chemical. The appropriate wavelength of radiation is selected by reference to the absorption, emission and excitation spectra of the transition metal alcoholate complex solution to be of an intensity capable of inducing reduction of the metal to the desired active state. The main factors to be considered in this selection are the maximization of the absorption of the selected radiation, the maximization of the vibrational degradation process of the complex, resulting in fluorescence, and the minimization of the disassociation of the complex. A radiation source satisfying the above criteria is selected. The solution is then irradiated to produce the desired reduction product.

A feature of the invention is the use of a photo-regenerated transition metal complex to catalytically produce a reduction product.

More specifically, the method may be used to catalytically produce ammonia or hydrazine by the reduction of molecular nitrogen. Substituted aliphatic hydrazines may also be reduced to aliphatic amines by the method.

This method may also be used to reduce oxides of nitrogen ($NO_x$), carbon monoxide and carbon dioxide. Obvious applications include the conversion of environmental air pollutants to recoverable liquids.

A further use of the method is for the reduction of unsaturated hydrocarbons.

Other features and uses of the invention will be apparent from the remainder of the specification and claims. While the invention will be described in connection with the preferred embodiment, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE INVENTION

The reaction solution may be produced by dissolving a transition metal salt in an alcohol solvent.

The alcohol should be capable of coordinating with the transition metal ion. Suitable alcohols include the monoprotic alcohols such as methanol, ethanol and propanol.

The transition metal salt must be soluble in the alcohol solvent which has been chosen so as to provide a solution containing a sufficient concentration of metal ions. The metal ions form soluble transition metal alcoholates in solution. These transition metal alcoholates form the catalytic reducing complex.

This catalytic reducing complex is formed in a first electron state. When photo-activated the metal ion of the transition metal alcoholate is reduced to a second electron state. This second electron state is the active state of the active reducing agent. This active reducing agent should have a reduction potential sufficiently high to produce the desired reduction product.

Salts of the transition metals exhibiting the desired characteristics listed above provide the metal ions necessary for the catalytic reducing complex. Of particular usefulness are the salts of the lanthanides, actinides and of Groups Vb, VIb, and VIII. Salts of vanadium, and particularly of trivalent vanadium have been found to be the most useful. Examples of appropriate salts include $VCl_3.4(CH_3OH)$, $VCl_3.4H_2O$, V.catechol complex, $VOSO_4$, VO(acetylacetone), $VOCl_2$, VOCl, $CrCl_3$, Cr.catechol complex, $FeCl_2$, $Co(ME_6(14-)diene)(4)$, $Co(Me_4(16)diene\ N_4)$, $Ru(bpy)_3Cl_2$, $Ru(4,4'-dicarboxy-2,2'dipyridine\ diisopropylester)_3^{+2}$, $CeCl_4$, $SmCl_3$.catechol, $EuCl_3$, $EuCl_3$.catechol complex, $UCl_4$, and $UCl_6$.

Sufficient base is added to the reaction solution to maintain the pH above about 8.5 Suitable bases include sodium and potassium hydroxides.

A multidentate bridging compound may also be included in the reaction solution. It is believed that such a compound enhances the reaction. An appropriate example of a multidentate bridging compound to use with the invention is catechol, i.e., 1,2-dihydroxybenzene.

Starting chemicals containing a double or triple bond which may be reduced by the method of the invention include molecular nitrogen, oxides of nitrogen, hydrazine, substituted aliphatic hydrazines, alkynes, alkenes, carbon monoxide and carbon dioxide.

The starting chemicals must be brought into contact with the active transition metal alcoholate complex solution. The chemical to be reduced may be directly introduced into the solution by means of an aspirator, nozzle or the like. Alternatively the solution may be maintained under an atmosphere comprising the starting chemical.

Each combination of the transition-metal salt and alcohol solution will produce a transition metal alcoholate complex having a different optimum radiation wavelength to produce the active catalyst. The radiation wavelength to be used should be selected with reference to the absorption, emission and excitation spectra of the particular transition metal alcoholate complex in solution. The most significant factors in this selection include the maximization of the absorption of said radiation, the maximization of the vibrational degradation process, resulting in fluorescence, and the minimization of the dissociation of the complex. Any skilled technician will be able to make the determination of the wavelength appropriate for the desired transition metal alcoholate complex by studying the absorption, emission and excitation spectra of the complex in the parent alcohol. Excitation at the charge-transfer transition band from ligand to metal is desired. Excitation at shorter wavelengths may cause dissociation of the transition metal alcoholate complex and with excitation at longer wavelengths, dissociation may compete with vibrational degradation of the complex resulting in fluorescence. The radiation producing the appropriate charge transfer state will usually be in the ultraviolet range.

A discrete radiation source may be used. However, any broad source including the optimum wavelength may also be used, provided that it does not also include wavelengths responsible for significant competing reactions. A broad band radiation source might be preferred for the greater intensity of radiation in its output. The skilled technician can easily determine the best radiation source by studying the absorption, emission and excitation spectra of the complex in the parent alcohol as above.

Radiation from the selected source is applied to the solution of the selected transition metal alcoholate complex at an intensity and for a time sufficient to reduce the inactive transition metal in the alcoholate complex to an active state. This active state reduces the starting chemical, producing the desired reduction product. During this reduction, the metal ion is oxidized back to its original inactive state in the transition metal alcoholate complex.

EXAMPLE

This example of the invention illustrates a photoinduced catalytic nitrogen reduction in which molecular nitrogen was reduced to ammonia in methanol solution. Hydrogen was simultaneously evolved. The catalyst precursor was vanadium (III) methanolate combined with both catechol and sodium hydroxide. The reaction was induced by irradiation with ultraviolet light. Irradiation with ultraviolet light reduced the transition metal of the vanadium (III) methanolate complex to vanadium (II), a strong reducing agent. The active vanadium (II) reduced molecular nitrogen to ammonia, while itself being oxidized to vanadium (III). The catalytic formation of ammonia and hydrogen can be accounted for as a result of this light-driven coupled oxidation/reduction process of vanadium (III)/(II).

The vanadium (III) methanolate solution was prepared by dissolving vanadium trichloride in methanol. Three milliliters of a homogeneous methanol solution of vanadium (III), containing 25 micromoles of vanadium (III), 250 micromoles of catechol, and 300 micromoles of sodium hydroxide, was placed under a nitrogen pressure of 634 torr at room temperature and irradiated at 313 namometers for six days. Two micromoles of ammonia, 51 micromoles of hydrogen, and 62 micromoles of formaldehyde were produced.

The foregoing description of the invention has been directed in primary part to a particular preferred embodiment in accordance with the requirements of the Patent Statutes and for purposes of explanation and illustration. It will be apparent, however, to those skilled in the art that many modifications and changes in this specific method may be made without departing from the scope and spirit of the invention. It is applicant's intention in the following claims to cover such modifications and variations as fall within the true spirit and scope of the invention.

What is claimed is:

1. A catalytic method of producing a reduction product in solution at ambient temperature and pressure by using a reducing agent which is simultaneously photo-regenerated to its active reducing state following its consumption in the reduction, comprising the steps of:
   (a) obtaining a solution of a transition metal alcoholate complex comprising an alcohol, a transition metal salt, and a base;
   (b) contacting with said solution a starting chemical selected from the group consisting of molecular nitrogen, oxides of nitrogen, hydrazine, and aliphatic substituted hydrazines; and
   (c) while maintaining said contact, irradiating said solution with radiation of sufficient intensity and duration to produce the desired product, wherein said radiation is selected at the charge-transfer band of the transition metal alcoholate complex by reference to the absorption, emission and excitation spectra of said metal alcoholate complex solution so as to
(i) maximize the absorption of said radiation;
(ii) maximize the vibrational degradation process, resulting in fluorescence; and
(iii) minimize the dissociation of said complex.

2. The catalytic method as defined in claim 1, wherein said solution of a transition metal alcoholate further comprises a multidentate bridging ligand.

3. The catalytic method as defined by claim 2, wherein said multidentate bridging ligand is selected from the group consisting of catechols.

4. The catalytic method as defined by claim 1, wherein the transition metal is vanadium.

5. The catalytic method as defined by claim 1, wherein the alcohol is a monoprotic alcohol.

6. The catalytic method as defined by claim 5, wherein the alcohol is selected from the group consisting of methanol, ethanol and propanol.

7. The method of creating a chemically active reducing environment capable of reducing molecular nitrogen at ambient temperature and pressure and of being regenerated to its chemically active reducing state following a reduction process which comprises:
(a) forming a solution containing a soluble salt of a transition metal selected from the group consisting of the lanthanides and the transition metals of groups Vb, VIb and VIII, a monoprotic alcohol compatible therewith and a base;
(b) maintaining the pH of said aqueous solution at a pH above about 8.5, whereby said transition metal and said alcohol form a soluble metal alcoholate complex wherein the transition metal ion is at a first electron state;
(c) subjecting said solution to a suitable intensity of a radiation selected to include the charge-transfer band of the transition metal alcoholate complex by reference to the absorption, emulsion and excitation [IR] spectra of said metal alcoholate complex so as to
(i) maximize the absorption of said radiation;
(ii) maximize the vibrational degradation process, resulting in fluorescence; and
(iii) minimize the dissociation of said complex; whereby said transition metal ion is transformed to a higher electron state capable of accepting electrons from nitrogen dissolved in said solution and thus being oxidized to the desired reducing agent.

8. The method as defined by claim 7, wherein the transition metal is selected from the group consisting of vanadium, chromium, iron, cobalt, ruthenium, cerium, europium, samarium and uranium.

9. The method as defined by claim 8, wherein the transition metal is vanadium.

10. The method as defined by claim 9, wherein the solution further comprises a multidentate bridging compound selected from the group consisting of catechols.

11. A catalytic method of producing a reduction product in solution at ambient temperature and pressure by using a reducing agent which is simultaneously photo-regenerated to its active reducing state following its consumption in the reduction comprising steps of:
(a) obtaining a solution of a transition metal alcoholate comprising an alcohol, a transition metal salt, and a base;
(b) contacting with said solution a starting chemical selected from the group consisting of alkenes, alkynes, and carbon monoxide;
(c) while maintaining said contact, irradiating said solution with radiation of sufficient intensity and duration to produce the desired product, wherein said radiation is selected at the charge-transfer band of the transition metal alcoholate complex by reference to the absorption, emission, and excitation spectra of said metal alcoholate complex so as to
(i) maximize the absorption of said radiation;
(ii) maximize the vibrational degradation process, resulting in fluorescence; and
(iii) minimize the dissociation of said complex.

12. The catalytic method as defined by claim 11, wherein said solution of a transition metal alcoholate further comprises a multidentate bridging ligand.

13. The catalytic method as defined by claim 12, wherein said multidentate bridging ligand is selected from the group consisting of catechols.

14. The catalytic method as defined by claim 11, wherein the transition metal is vanadium.

15. The catalytic method as defined by claim 11, wherein the alcohol is a monoprotic alcohol.

16. The catalytic method as defined by claim 15, wherein the alcohol is selected from the group consisting of methanol, ethanol and propanol.

* * * * *

UNITED STATES PATENT AND TRADEMARK OFFICE
CERTIFICATE OF CORRECTION

PATENT NO. : 4,287,036
DATED : September 1, 1981
INVENTOR(S) : Minoru Tsutsui and Yoshiharu Doi It is certified that error appears in the above—identified patent and that said Letters Patent is hereby corrected as shown below:

```
        Column 1, line 22, change "heated" to --headed--;
                 line 50, change "occured" to --occurred--.
        Column 2, line 64, change "acticity" to --activity--.
        Column 3, line 4, after "Y" add --.--;
                 line 36, change "quicklly" to --quickly--.
        Column 4, line 23, change "disassociation" to
--dissociation--.
        Column 5, line 12, change "Co(ME6(14-" to --Co(Me6(14)--;
                 line 13, change ")diene)(4)," to
--diene)(4),--;
                 line 13, change "Ru(4,4-" to --Ru(4,4'--;
                 line 14, change "'dicarboxy" to --dicarboxy--;
                 line 18, after "8.5" insert --.--.
```

Signed and Sealed this

Twentieth Day of April 1982

|SEAL|

Attest:

GERALD J. MOSSINGHOFF

*Attesting Officer*   *Commissioner of Patents and Trademarks*